United States Patent [19]

Gach

[11] Patent Number: 4,672,874
[45] Date of Patent: Jun. 16, 1987

[54] GLASS SCORING ASSEMBLY

[76] Inventor: Paul Gach, 9801 S. A1A-#387, Jensen Beach, Fla. 33457

[21] Appl. No.: 870,923

[22] Filed: Jun. 5, 1986

Related U.S. Application Data

[63] Continuation of Ser. No. 674,852, Nov. 26, 1984, Pat. No. 4,628,784.

[51] Int. Cl.$^4$ .......................... B26D 3/08; C03B 33/10
[52] U.S. Cl. .................................. 83/881; 30/164.95; 83/886
[58] Field of Search .......................... 83/881, 884–887; 30/164.5; 33/32 E, 27 R

[56]  References Cited

U.S. PATENT DOCUMENTS

| | | | |
|---|---|---|---|
| 229,228 | 6/1880 | Adams | 30/164.95 |
| 2,210,193 | 8/1940 | Aillaud | 30/164.95 |
| 3,387,480 | 6/1968 | Eaker et al. | 83/886 X |
| 4,120,220 | 10/1978 | Muller | 83/648 X |
| 4,222,300 | 9/1980 | El-Habr | 83/886 |
| 4,228,711 | 10/1980 | Insolio | 83/886 X |
| 4,437,376 | 3/1984 | Flint | 83/881 X |
| 4,494,444 | 1/1985 | Masse | 83/886 |
| 4,495,845 | 1/1985 | Sherby | 83/886 |

*Primary Examiner*—Frank T. Yost
*Attorney, Agent, or Firm*—John H. Faro

[57] ABSTRACT

Disclosed is an improved apparatus for scoring glass wherein a scoring wheel is rotatably mounted on an axle within a novel mounting bracket. The mounting bracket can be the extension of the handle of a manual glass scoring device or integrated within a cartridge for an automated or semi-automated glass scoring machine. One of the unique features of the improved apparatus of this invention resides in the spatial geometry of the clearance between the mounting bracket and the scoring wheel. The enhanced degree of clearance between these two components substantially reduces maintenance requirements and improves consistency of performance. This results in reduction in accumulation of glass chips between the wheel and the mounting bracket, thereby insuring continuous freedom of movement of the scoring wheel within the bracket even after extended periods of use. Such enhanced clearance also enables simple and precise lubrication of the axle which supports the scoring wheel. Another of the unique features of this invention resides in the design and construction of the adjustable spindle to which the mounting bracket is attached. This spindle is internally spring loaded thereby providing an enhanced degree of precision bearing surface between the spindle and the guide channels within the arbor of a glass scoring machine.

7 Claims, 7 Drawing Figures

U.S. Patent  Jun. 16, 1987  Sheet 1 of 4  4,672,874

GLASS SCORING ASSEMBLY

CROSS REFERENCE

This application is a continuation of U.S. Ser. No. 674,852, filed Nov. 26, 1984, now U.S. Pat. No. 4,628,784.

DISCLOSURE DOCUMENT REFERENCE

The subject matter of this invention is described, in part, in disclosure document No. 130939, filed Sept. 17, 1984.

BACKGROUND OF THE INVENTION

1. Field of the Invention

This invention is directed to a device, an apparatus and to a method. More specifically, this invention concerns itself with an improved glass-scoring device, semi-automated and automated glass scoring equipment utilizing the improved glass scoring device, an improved spindle for supporting the glass scoring device and a method for scoring glass.

2. Description of the Prior Art

The art of scoring and cutting glass has remained virtually unchanged for more than 50 years. Typically, the glass surface of the workpiece is initially cleaned to insure freedom from dirt and other extraneous matter. A straight edge can then be laid across the workpiece and a scoreline made with a hand-held glass "cutter". The so-called glass cutter lightly fractures the surface of the glass and the artisan then breaks the glass along score line. In such manual operation of the scoring tool it is difficult to maintain constant pressure and thus attain a uniform score line.

In the art of making stained glass panels and other objects, the technique is quite similar to the above except for the geometry of the individual pieces of glass from which the item is assembled. The individual pieces are generally assymetric shapes requiring precise scoring to enable later assembly into the finished article. Semi-automated devices have recently been introduced to increase operator control over this scoring process. These devices, of the type illustrated in U.S. Pat. Nos. 4,385,540, 4,222,300 and 4,120,220, all generally employ an arbor-mounted scoring implement which, is generally immobile, and means for movement of the glass workpiece relative to the immobilized scoring implement. In order to increase the precision of the scoreline on the glass surface, the scoring implement, and the scoring wheel associated with such implement, must be mounted securely and rigidly supported.

FIG. 4 of U.S. Pat. No. 4,385,540 is illustrative of the type of scoring implement which possesses the support and rigidity so essential for precise and repeatable glass scoring operations. Unfortunately, the needs for support and rigidity have traditionally dictated very limited clearance between the scoring wheel and the supporting bracket. This type of configuration can, however, have its drawbacks; the principle one being the accumulation of glass chips between the scoring wheel and the supporting bracket. The accumulation of chips and other debris can result in the binding of the scoring wheel within the bracket and adversely affect the operation of the device. When the scoring wheel is prevented from free motion, the scoring action of the device deteriorates dramatically.

The incorporation of an oil reservoir within the handle of such devices can provide a source of lubrication of the axle which supports the scoring wheel; however, does not resolve the problem of binding of the wheel within the mounting bracket. In fact, the presence of oil at this interface, is thought by some, to increase the accumulation of glass chips thereby further aggravating this problem. When glass chips accummulate in sufficient concentration to prevent free wheeling of the scoring element, the scoring process must be discontinued until the glass chips can be removed. As is readily appreciated, this problem is most pronounced in semi-automated and automated glass-scoring equipment due to the greater throughput of such devices.

OBJECTS OF THE INVENTION

Accordingly, it is the object of this invention to remedy the above as well as related deficiencies in the prior art.

More specifically, it is the principle object of this invention to provide an improved glass-scoring device having a reduced tendency for accummulation of glass chips between the scoring wheel and the supporting bracket.

It is another object of this invention to provide a glass-scoring assembly wherein the spatial geometry of the space between the scoring wheel and the supporting bracket provides for an enhanced clearance within an area traditionally associated with the accummulation of glass chips.

It is yet another object of this invention to provide an adjustable spindle for supporting a glass scoring assembly in which side play and torosional movement are minimized during the scoring operation.

It is still yet another object of this invention to provide an improved method for scoring glass and an improved semi-automated and automated glass-scoring device which can operate for substantial periods of time without interruption.

SUMMARY OF THE INVENTION

The above and related objects of this invention are achieved by providing an improved glass-scoring assembly which includes a scoring wheel rotatably mounted on an axle to a supporting bracket. The spatial geometry of the area between the mounting bracket and the scoring wheel is enlarged to provide for enhanced clearance therebetween in the area traditionally associated with the accumulation of glass chips. This modification in the mounting bracket generally involves simply an enlargement in the bracket slot above the scoring wheel. The actual physical dimensions of this enlargement do not appear to be critical so long as it effectively prevents glass chips from becoming permanently lodged within the space between the bracket and the scoring wheel. In the preferred embodiments of this invention, the scoring assembly is a disposable element of an integrated glass-scoring system. In another of the preferred embodiments of this invention, the glass scoring assembly is mounted on an internally spring loaded adjustable spindle. The placement of the tensioning spring within the body of the spindle substantially enhances the precision load bearing surface between the spindle body and the guide channel of the arbor from which it extends. As is readily appreciated such enhancement insures improved precision and stability of the scoring wheel of the glass scoring assembly without the need for additional stabilizing elements. The cross-section of the spindle is preferably assymetric or provided with tracking means to prevent torsional movement of the spindle assembly.

DESCRIPTION OF THE INVENTION INCLUDING PREFERRED EMBODIMENTS

Figure 1:
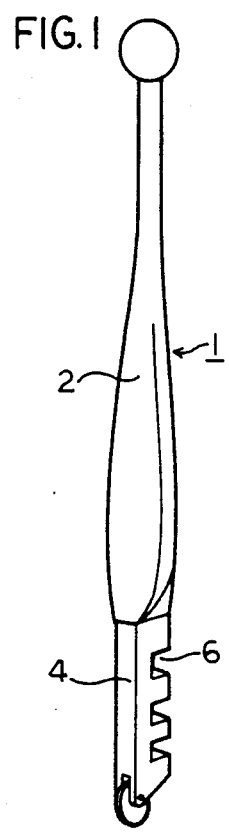
FIG. 1 is a perspective view of a manual glass-scoring tool wherein the scoring assembly is integral with the handle of the tool.

The following description of some of the preferred embodiments of the concepts of this invention is made in reference to the accompanying figures. Where the individual elements of these figures is depicted in more than one figure, they are assigned a common reference numeral for simplification of identification and understanding.

FIG. 1 is an illustration of a common glass-scoring tool (1) which is composed of two basic elements: a handle (2) and a scoring assembly (4). In the device illustrated in this figure, the scoring tip of the scoring assembly is further provided with a series of notches (6) to assist in breaking of the glass upon completion of the scoring operation.

Figure 2:
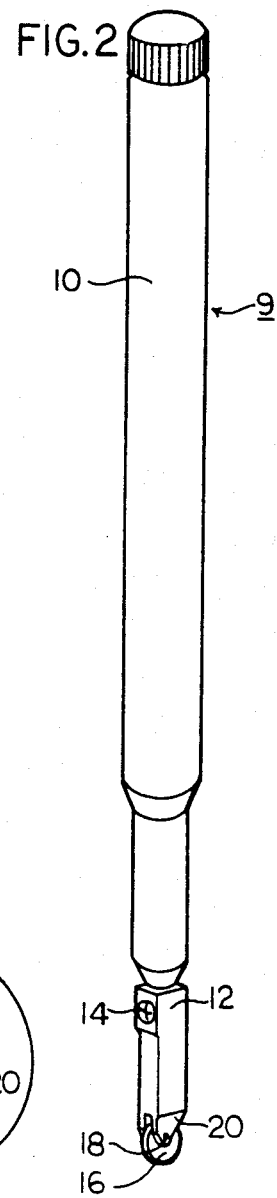
FIG. 2 is a perspective view of a manual glass-scoring tool wherein the scoring assembly is replaceably mounted on the handle which includes an oil reservoir.

FIG. 2 is another illustration of a common glass-scoring tool (9) which is composed of similar functional elements to the device illustrated in FIG. 1. The device of FIG. 2 is, however, distinctive in that the handle (10) also serves as an oil reservoir which supplies lubrication to the scoring assembly (12). The scoring assembly (12) is mounted to the handle (10) by a rod (not shown) and held securely in place by a set screw (14). Oil from the handle is gravity fed to the scoring assembly through a channel in the rod which joins the scoring assembly to the handle. Since this tool does not have any effective means for controlling the rate of flow of oil from the resevoir to the scoring assembly, this configuration of tool is notorious for leaking. The lubrication provided to the scoring assembly is intended to insure freedom of rotation of the scoring wheel (16) on its axle (18) and thereby enhance the ease of scoring of the glass workpiece. The addition of oil to the interface of the scoring wheel and the support bracket (20) also, increase the attraction and accummulation of glass chips on these lubricated surfaces. Accordingly, this tool requires constant maintenance to prevent binding of the scoring wheel (16) within the support bracket (20) by the debris which is generated during the scoring operation. This maintenance can typically require the removal of the accummulated debris with a piece of fine piano wire or a fine needle. While these maintenance associated inconveniences do not present insurmountable problems, they do require constant vigilance in order to avoid binding of the scoring wheel during a scoring operation.

Figure 3:
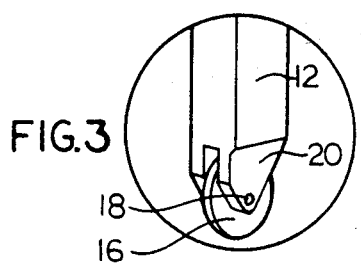
FIG. 3 is an enlarged view of the scoring assembly of FIG. 2.

FIG. 3 is an enlarged view of the scoring assembly (12) of the tool of FIG. 2 wherein the scoring wheel (16) is rotatably mounted on an axle (18) within the slot (40) of the mounting bracket (20). As is evident from this perspective, only a few glass chips are all that is required to effectively bind the scoring wheel against the mounting bracket. Because of the close tolerances requisite for the strength and stability of this element, design innovations have up to now been limited to other facets of the glass-scoring tool.

Figure 4:
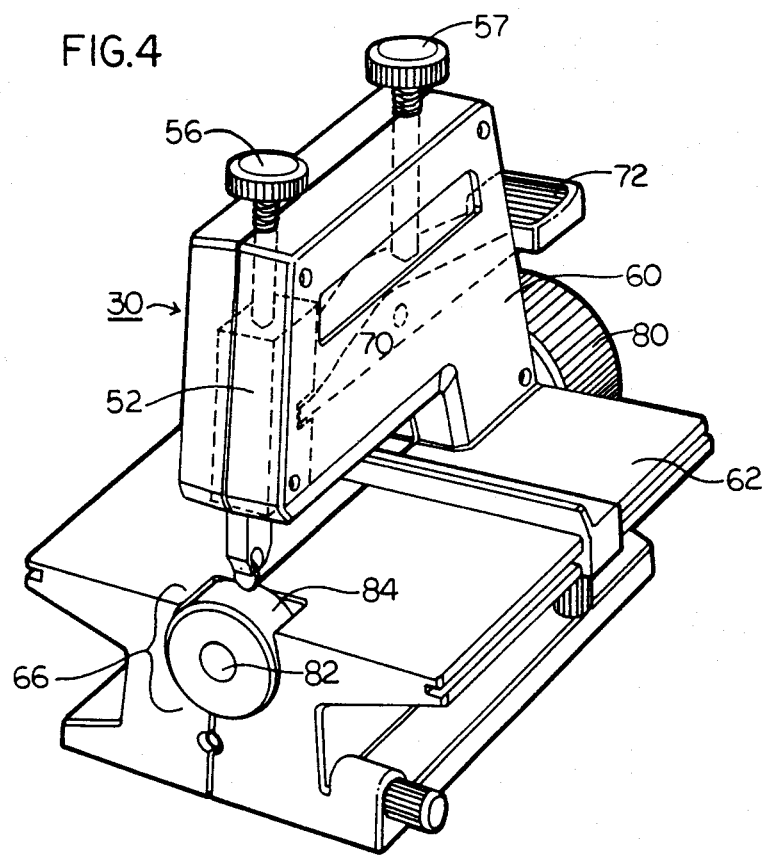
FIG. 4 is a perspective view of a a semi-automated glass-scoring machine.

FIG. 4 illustrates a perspective view of a semi-automated glass-scoring machine (30) employing the innovative glass-scoring assembly of this invention.

The machine shown in this figure illustrates some of the innovative approaches to, and improvements attainable in both the accuracy and reproducability to the precision glass scoring art. The superstructure of this machine is similar to a sewing machine and includes an arbor (60), a table or platform (62) for support of the workpiece, a pressure adjustable spindle (52) and a drive mechanism (66) for conveyance of the workpiece relative to the pressure adjustable spindle. During the operation of this machine, a piece of glass (not shown) of a defined thickness is placed in scoring relationship to the pressure adjustable spindle (64) and the drive mechanism (66). The spring tension on and the height of the spindle are adjusted by manipulation of tension adjusting screw (56) and height adjustment screw (57), respectively, within appropriate limits to insure sufficient pressure on the scoring wheel to effectively score the workpiece and yet prevent chipping the edge of the workpiece upon completion of the scoring operation (i.e. run-off of the scoring wheel from the glass surface). This pressure adjustable spindle is described in greater detail in the discussion of FIG. 5. In the embodiment of the drive mechanism illustrated in FIG. 4, a hand-actuated crank (80) turns a shaft (82) which causes the drive roller (84) to advance the workpiece into and through the scoring station defined by the scoring wheel (of the spindle assembly) and the drive roller (of the drive mechanism). The combined input from the drive roller and the scoring wheel effectively results in scoring of the workpiece along a prescribed scoring path. This scoring path can be an intricate shape of the type commonly found in stained glass panels and decorative objects; or, can be a straight line. In the latter situation, this glass-scoring machine can be further provided with a guide (not shown)—in the nature of a rip fence—to enable repeatable and accurate straight-line scoring. Other optional accessories which can be adapted to this machine can include devices, (i.e. turntables) to permit repeatable and accurate scoring of circles. The drive mechanism of this machine is a manual crank assembly, and generally is preferred for precision scoring operations. The improved scoring assembly permits the rapid and simple removal of debris from the interface of the scoring wheel and the support bracket with a conventional tobacco smokers' pipe cleaner. If so desired, this same pipe cleaner can be used to provide lubrication to the axle of the scoring assembly.

Figure 5:
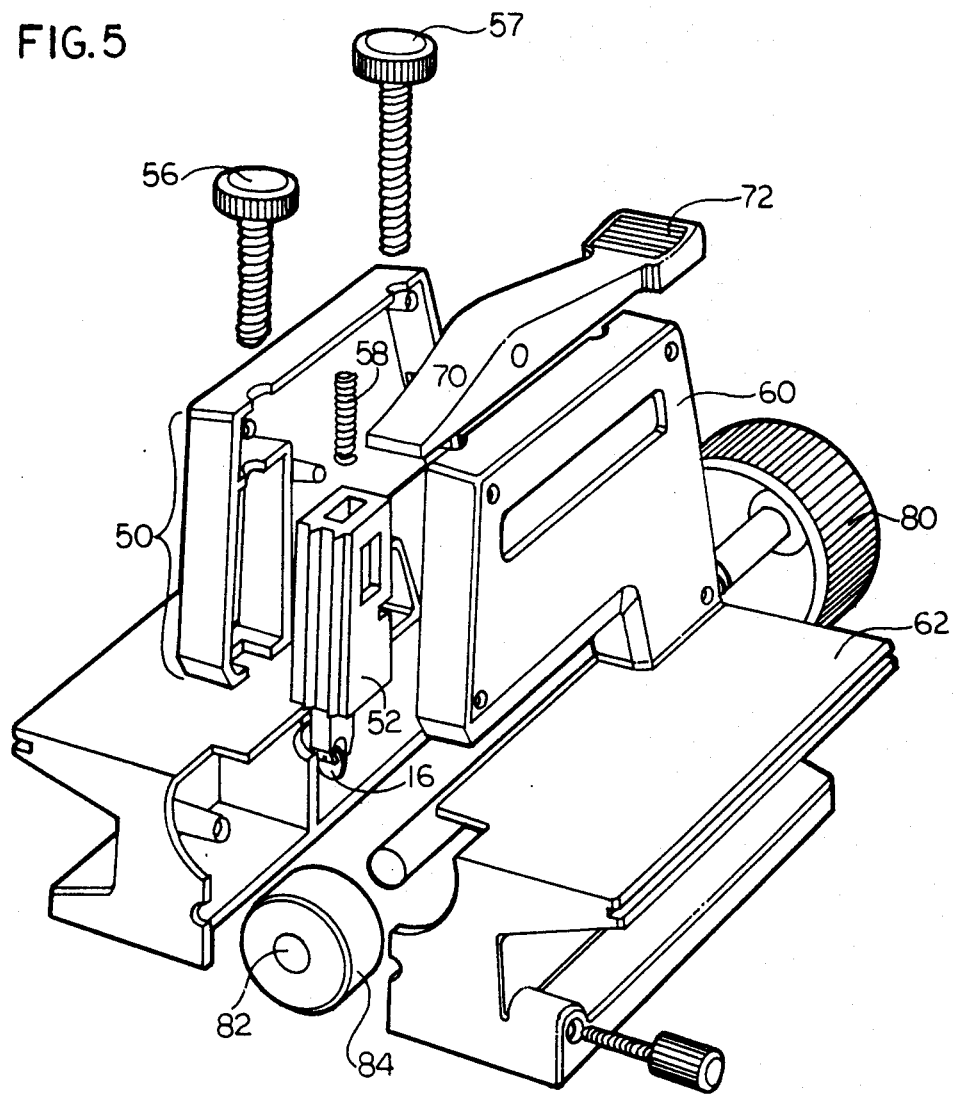
FIG. 5 is an exploded view of a semi-automated glass-scoring machine of FIG. 4 revealing in greater detail the scoring assembly.

FIG. 5 is an exploded view of a portion of the arbor (50) which houses the spindle (52). The spindle (52) is generally rectangular in both the vertical dimension and in cross-section. The specific shape of the spindle is a matter of choice provided it is sufficiently asymmetric in cross-section so as to be effectively constrained by the guide channel (not shown) within the arbor to inhibit torsional movement during operation of the device. The relative arrangement of the spindle to the guide channel within the arbor is designed to insure maximum precision bearing surface therebetween to minimize side play, and thus insure enhanced stability of the scoring assembly which is affixed to one end of the spindle.

In the preferred embodiments of this invention which are illustrated in FIG. 5, the spindle (52) is pressure adjustable by means of a tensioning screw (56) which in turn controls the degree of compression of internal spindle spring (58). The internal spring loading of the spindle in the manner illustrated in this Figure permits enhancement in the degree of precision bearing surface between the spindle and it's guide channel within the arbor. The tension on the spindle is also controlled by the action of a displacement lever (70) which is pivotably mounted within the arbor and manually activated by simply depression of the activation arm (72). The fine (height) adjustment of the displacement lever is based upon the thickness of the glass and the ultimate setting which is selected is intended to prevent chipping of the edge of the glass when the scoring wheel runs off the workpiece.

In operation of this device, the lever (70) is initially pivotally engaged by the activation arm (72) thereby lifting the spindle vertically. The workpiece is thereupon positioned upon the machine table (62) so as to locate the workpiece between the drive roller (84) and the scoring wheel (16) of the scoring assembly (12'). Once the workpiece is in position, the spindle is gently lowered so as to permit the engagement of the workpiece between the drive roller (84) and the scoring wheel (16). This process of displacement of the spindle can be repeated until precise placement of the workpiece is achieved relative to the scoring assembly. Good results have been obtained where the adjustment of the displacement arm permits the cutting wheel to extend below the surface of the workpiece to about the level of the axle. The tension screw (56) is then adjusted to within a prescribed range of pressure until the desired fracture characteristics are achieved on the workpiece. This dual adjustment of the spindle relative to the workpiece provides a dramatic improvement in the control and in the quality of the scoring over the current state of the art devices.

Figure 6:
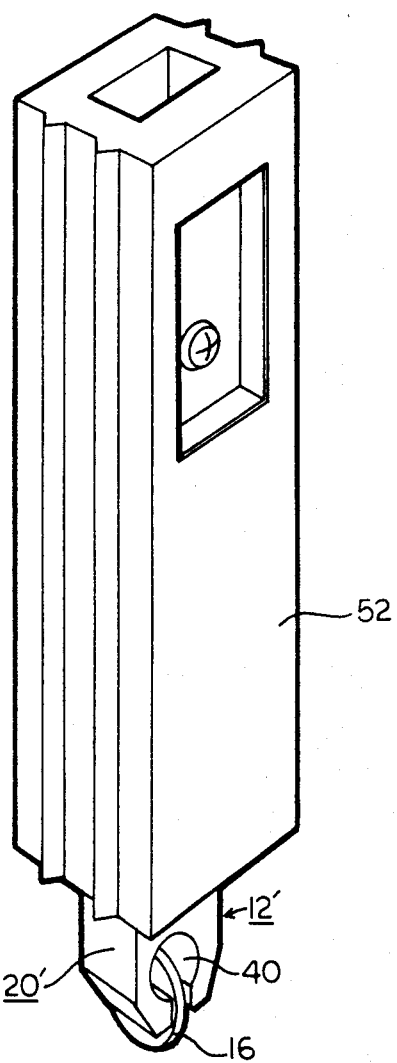
FIG. 6 is an enlarged view of the scoring assembly of FIG. 5.

FIG. 6 is an enlarged view of the scoring assembly (12') in relation to the spindle. As is shown in this figure, the scoring assembly is aligned within the spindle so as to be in a vertical plane coincident with the spindle spring (58) and the tension screw (56). The scoring assembly is retained within the spindle by a recessed set screw (57) and can be readily disengaged and replaced as necessary.

Figure 7:
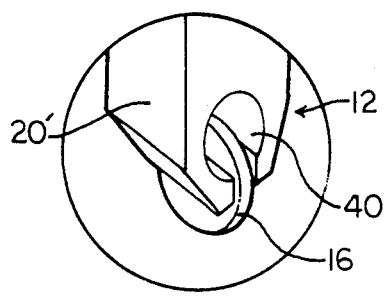
FIG. 7 is an enlarged view of the scoring tip of the scoring assembly of FIG. 6.

FIG. 7 is an enlarged view of the scoring assembly of FIG. 6 wherein the scoring wheel (16) rotatably mounted on an axle (18) within the mounting bracket (20'). The slot (40') within the mounting bracket (20') is enlarged above the point of engagement of the axle (18) to allow for enhanced clearance between the mounting bracket (20') and the scoring wheel (16). The precise geometry this enlargement in the mounting bracket is not believed to be critical so long as sufficient clearance is provided between the walls of the slot in the mounting bracket above the scoring wheel to allow for ease of displacement of glass chips and other debris which is generated incident to the glass scoring process. As noted previously, a common pipe cleaner is all that is necessary to effectively dislodge any debris that has accumulated between the interface of the scoring wheel and the support bracket. In the embodiment of this invention which is illustrated in FIG. 7, the geometry of the slot above the axle resembles a keyhole. This is the design of choice since it is simple, relatively easy to fabricate and has been found to be effective in reducing the frequency of cleaning of the scoring assembly.

The foregoing Figures and description thereof is provided as illustrative as some of the preferred embodiments of the concepts of this invention. While these embodiments represent what is regarded as the best mode for the practice of this invention, they are not intended as deliniating the scope of the concept, which is set forth in the following claims.

What is claimed is:

1. A glass-scoring assembly including a scoring wheel rotatably mounted on an axle to a mounting bracket, said mounting bracket having a slot with an open end and a closed end which defines a supporting structure for said scoring wheel, the open end of the slot permitting extension of said scoring wheel from the mounting bracket and the closed end of the slot providing for enhanced clearance between said scoring wheel and said bracket so as to assure for ease of displacement of glass chips and other debris which can accumulate at the interface between the scoring wheel and the mounting bracket during the glass-scoring process, said enhanced clearance being achieved by enlargement in the slot above the point of engagement of the axle and the slot so that the width of the slot at the closed end is greater than the width of the slot at the open end.

2. The assembly in claim 1, wherein the scoring wheel comprises carbide steel.

3. The assembly of claim 1, wherein the scoring assembly is integral with the glass-scoring tool.

4. The assembly of claim 1, wherein the assembly is adapted to cooperate with a spindle of a glass-scoring machine.

5. The glass-scoring assembly of claim 1, wherein the slot is formed in the shape of a key hole and wide enough at the closed end thereof to accommodate a pipe cleaner.

6. In a glass-scoring machine comprising an arbor, a table for supporting a glass workpiece, a pressure-adjustable spindle positioned within said arbor and adapted for engaging said glass sheet, means for transporting a glass workpiece relative to said spindle whereby a scoring means within said spindle effects a score pattern onto a glass sheet, the improvement comprising:

a glass-scoring assembly including a scoring wheel rotatably mounted on an axle to a mounting bracket, said mounting bracket having a slot with an open end and a closed end which defines a supporting structure for said scoring wheel, the open end of the slot permitting extension of said scoring wheel from the mounting bracket and the closed end of the slot providing for enhanced clearance between said scoring wheel and said bracket so as to assure for ease of displacement of glass chips and other debris which can accumulate at the interface between the scoring wheel and the mounting bracket during the glass-scoring process, said enhanced clearance being achieved by enlargement in the slot above the point of engagement of the axle and the slot so that the width of the slot at the closed end is greater than the width of the slot at the open end.

7. The improvement of claim 6, wherein the slot is formed in the shape of a key hole and wide enough at the closed end thereof to accommodate a pipe cleaner.

* * * * *